US006542498B2

(12) United States Patent
Socaciu

(10) Patent No.: US 6,542,498 B2
(45) Date of Patent: *Apr. 1, 2003

(54) SIGNALING SYSTEM AND METHOD TO CONNECT IDLE INTERNET END STATIONS WITH APPLICATION IN INTERNET TELEPHONY

(76) Inventor: Michael V. Socaciu, 18 Bixby La., Westford, MA (US) 01886

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/987,411

(22) Filed: Dec. 9, 1997

(65) Prior Publication Data

US 2001/0043607 A1 Nov. 22, 2001

(51) Int. Cl.[7] .......................... H04L 12/66; H04M 3/00; H04J 1/02
(52) U.S. Cl. ....................... 370/352; 370/400; 370/493; 370/356; 379/265.09
(58) Field of Search ................................ 370/352, 353, 370/354, 356, 237, 351, 389, 401, 496, 493, 392, 396, 400, 494, 495; 709/227, 226; 379/265.09, 265.01, 266

(56) References Cited

U.S. PATENT DOCUMENTS

| 5,884,038 | A | * | 3/1999 | Kapoor ........................ 709/226 |
| 5,907,547 | A | * | 5/1999 | Foladare et al. ............. 370/352 |
| 5,917,817 | A | * | 6/1999 | Dunn et al. .................. 370/352 |
| 5,953,322 | A | * | 9/1999 | Kimball ....................... 370/328 |
| 6,009,469 | A | * | 12/1999 | Mattaway et al. ........... 709/227 |
| 6,026,441 | A | * | 2/2000 | Ronen ......................... 709/227 |
| 6,069,890 | A | * | 5/2000 | White et al. ................. 370/352 |
| 6,108,329 | A | * | 8/2000 | Oyama et al. ............... 370/352 |
| 6,122,255 | A | * | 9/2000 | Bartholomew et al. ..... 370/352 |
| 6,130,933 | A | * | 10/2000 | Miloslavsky ............. 379/90.01 |
| 6,198,738 | B1 | * | 3/2001 | Chang et al. ................ 370/352 |
| 6,243,376 | B1 | * | 6/2001 | Ng et al. ..................... 370/352 |
| 6,263,066 | B1 | * | 7/2001 | Shtivelman et al. ........ 379/266 |

* cited by examiner

Primary Examiner—Kwang Bin Yao
Assistant Examiner—Hanh Nguyen

(57) ABSTRACT

A method of signaling including the steps of providing a first Internet end station, providing a second Internet end station, establishing a Plain Old Telephone network connection between the first Internet end station and the second Internet end station, exchanging an Internet item between the first Internet end station and the second Internet end station using the POT network connection, disconnecting the POT network connection between the first Internet end station and the second Internet end station, establishing an Internet connection between the first Internet end station and an Internet network, establishing an Internet connection between the second Internet end station and the Internet network, exchanging a first dynamic Internet address of the first Internet end station with a second dynamic Internet address of the second Internet end station, establishing an end to end Internet connection between the first Internet end station and the second Internet end station using dynamically assigned IP addresses over the Internet network, exchanging voice traffic between the first Internet end station and the second Internet end station, terminating the voice traffic, and terminating the end to end Internet connection between the first Internet end station and the second Internet end station over the Internet network.

9 Claims, 9 Drawing Sheets

US 6,542,498 B2

SIGNALING SYSTEM AND METHOD TO CONNECT IDLE INTERNET END STATIONS WITH APPLICATION IN INTERNET TELEPHONY

FIELD OF THE INVENTION

The present invention relates to the field of telecommunications, and more particularly to an apparatus and method of executing a call between idle Internet end stations similar to a traditional telephone call.

BACKGROUND OF THE INVENTION

As is well known, a traditional telephone accesses its party through a Plain Old Telephone (POT) Network. And as is also well known, the functions of a traditional phone typically involve tone recognition (i.e., dial, busy, ring), DTMF tones generation (i.e., dialing), and voice analog signal transfer. The traditional telephone gets a line (i.e., hook off), dials waits to connect to another party and then establishes a full duplex voice connection. Through dialing, the well known POT network protocols allow connection to any subscriber, at any desired time.

As is also well known, traditional telephone access is accomplished at any desire time because each telephone has a unique, fixed address, and by hook-off it connects to the transport network. This unique fixed address is generally referred to as a telephone number. Establishing a connection using the Internet in place of the POT network access present a unique problem. As is well known, one cannot use the Internet to make an end to end connection unless each end station is connected (or attached) to the Internet prior to making the Internet connection. Furthermore, it is well known that by attaching to the Internet, the same party may receive each time it attaches (or connects) to the Internet a different Internet Protocol (IP) address. This is generally referred to as dynamic addressing. Therefore, it is known to be difficult to connect two parties or end stations via phone using the Internet because of this dynamic addressing. As mentioned above, this dynamic Internet network addressing differs from the fixed addressing associated with the POTS network.

What is needed is a method and system that can easily and efficiently connect idle Internet end stations at any desired time.

SUMMARY OF THE INVENTION

In accordance with the principles of the present invention a method of signaling is provided including the steps of providing a first Internet end station, providing a second Internet end station, establishing a Plain Old Telephone network connection between the first Internet end station and the second Internet end station, exchanging an Internet item between the first Internet end station and the second Internet end station using the POT network connection, disconnecting the POT network connection between the first Internet end station and the second Internet end station, establishing an Internet connection between the first Internet end station and an Internet network, establishing an Internet connection between the second Internet end station and the Internet network, exchanging a first dynamic Internet address of the first Internet end station with a second dynamic Internet address of the second Internet end station, establishing an end to end Internet connection between the first dynamic Internet address and the second Internet address over the Internet network, exchanging voice traffic between the first Internet end station and the second Internet end station, terminating the voice traffic, and terminating the end to end Internet connection between the first dynamic Internet address and the second Internet address over the Internet network.

BRIEF DESCRIPTION OF THE DRAWINGS

The novel features believed characteristic of the invention are set forth in the appended claims. The invention itself, however, as well as features and advantages thereof, will be best understood by reference to the detailed description of specific embodiments which follows, when read in conjunction with the accompanying drawings, wherein:

DETAILED DESCRIPTION OF THE PREFERRED EMBODIMENT(S)

The present invention illustrates an application using Internet phones, but the invention may be applied to any Internet end stations.

Figure 1:
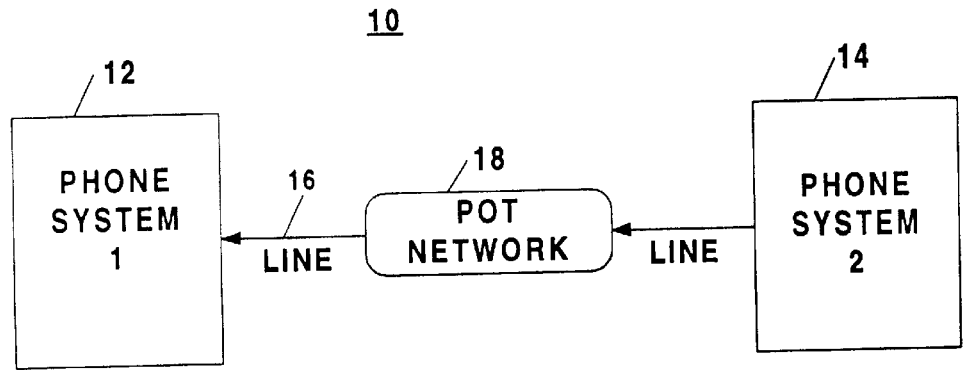
FIG. 1 is a block diagram of an exemplary traditional phone system using a Plain Old Telephone (POT) network.

Referring to FIG. 1, an exemplary traditional telephone system 10 is shown to include two telephone systems labeled 12 and 14, respectively. Telephone system 12 and telephone system 14 are shown connected to each other via a line 16 connect to a Plain Old Telephone (POT) network 18. By way of example, telephone system 12 gets the line 16, dials, waits to connect to the telephone system 14 and then establishes a full duplex voice connection through the POT network 18. Through the dialing process, the POT network 18 and its well known protocols (not shown) allow connection between telephone system 12 and telephone system 14.

Figure 2:
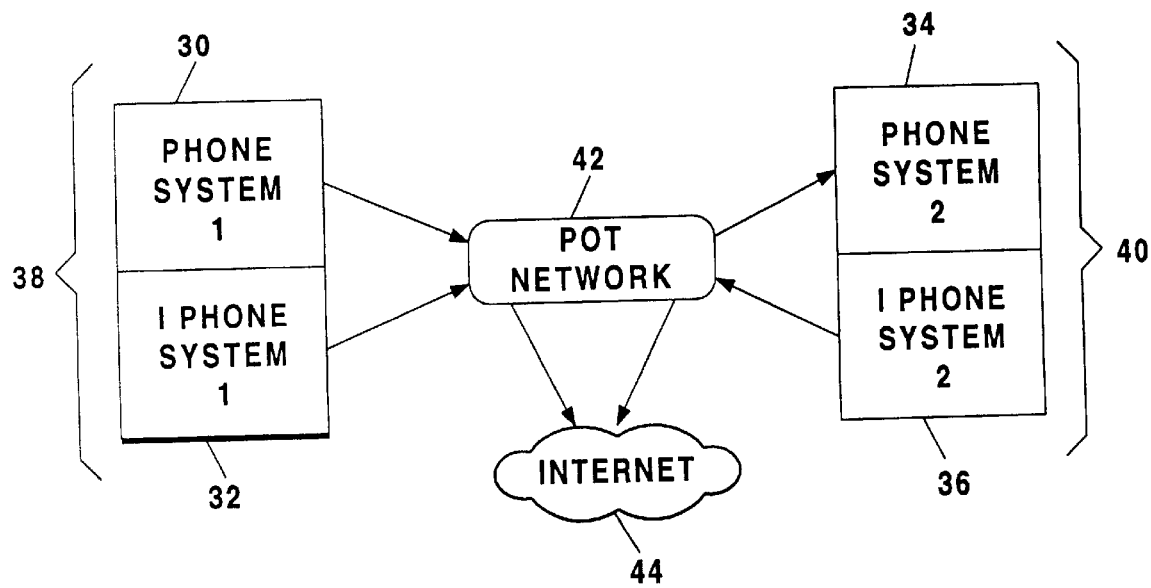
FIG. 2 is a block diagram of a first Internet End Station System (or Internet phone system) coupled with a second Internet End Station System (or Internet phone system) in accordance with the principles of the present invention.

Referring to FIG. 2, a phone system 30 is shown coupled with an Internet end station system, i.e., Internet phone (Iphone) system, 32 and a phone system 34 is shown coupled with an Internet phone (Iphone) system 36. By way of example, the present embodiment will use an Iphone as an example. It should be noted that the principles of the present invention apply to any Internet end station system. The phone system 30 and Iphone system 32 form a single Internet party 38, while the phone system 34 and Iphone system 36 form a single Internet party 40. Internet party 38 and Internet party 40 is further shown connected to a standard Plain Old Telephone (POT) network 42 and an Internet network 44. As can be seen in FIG. 2, and will be described more fully below, an Internet party session, i.e., a call between two Internet parties, involves two phases. First, the phone system 30 of Internet party 38 calls a party using a traditional POT dialing mechanism through the POT network 42 and detects whether the party is an Internet party (such as Internet party 40) or a 'regular phone' (not shown). If the party is a regular phone, the Internet party 38 functions as a regular phone. If the party is another Internet party, such as Internet party 40, the Internet party 38 communicates to the party some information, fully described below, disconnects the connection to the POT network 42, and both the Internet party 38 and the Internet party 40 switch over to the Internet network 44 to complete an Internet connection. In one embodiment of the present invention, the Internet party 38 is part of a personal computer system (not shown) having a speaker subsystem (not shown) for audio output and a microphone subsystem (not shown) for audio input. It is more preferred that the speaker subsystem be a Sound Blaster audio card from Creative Labs, Inc., or other "Sound Blaster" compatible audio card.

Figure 3:
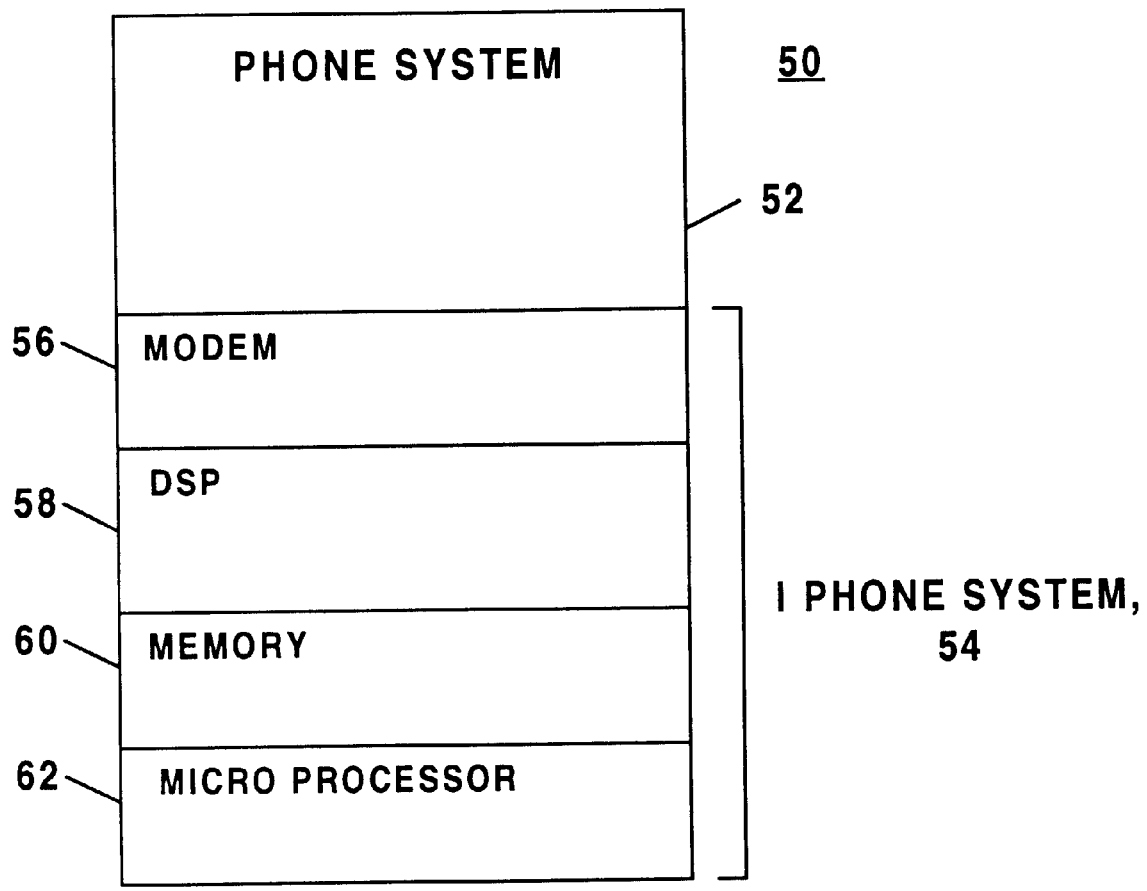
FIG. 3 is a block diagram illustrating the components of the Internet end station system (or Internet phone system) of FIG. 2.

Referring to FIG. 3, an Internet party 50 is shown to include a standard phone system 52 connected to an Iphone system 54. The Iphone system 54 includes a standard modem 56, a digital signal processing (DSP) unit 58, a memory 60, and a control microprocessor 62. The modularity of the Iphone system 54 permits the transformation of any traditional phone into an Internet party.

General control of the Iphone system 54 is implemented as a standard finite state machine, controlling the phone system 52 operation within all phases and sequences, starting, controlling, and stopping the modem 56, the DSP unit 58, the memory 60, and the microprocessor 62. Internet connection of the Iphone system 54 uses standard PPP, TCP/UDP/IP protocols. Any standard compression algorithm is utilized in the DSP unit 58.

It is preferred that in addition to the above components of the Iphone system 54 an auxiliary keyboard (not shown) be connected to the Iphone system 54. A configuration software module resident in the memory 60 dialogs with the auxiliary keyboard (not shown) and gets all external parameters that the phone system 52 requires, such as phone numbers, Internet addresses, and passwords, if required.

Figure 4:
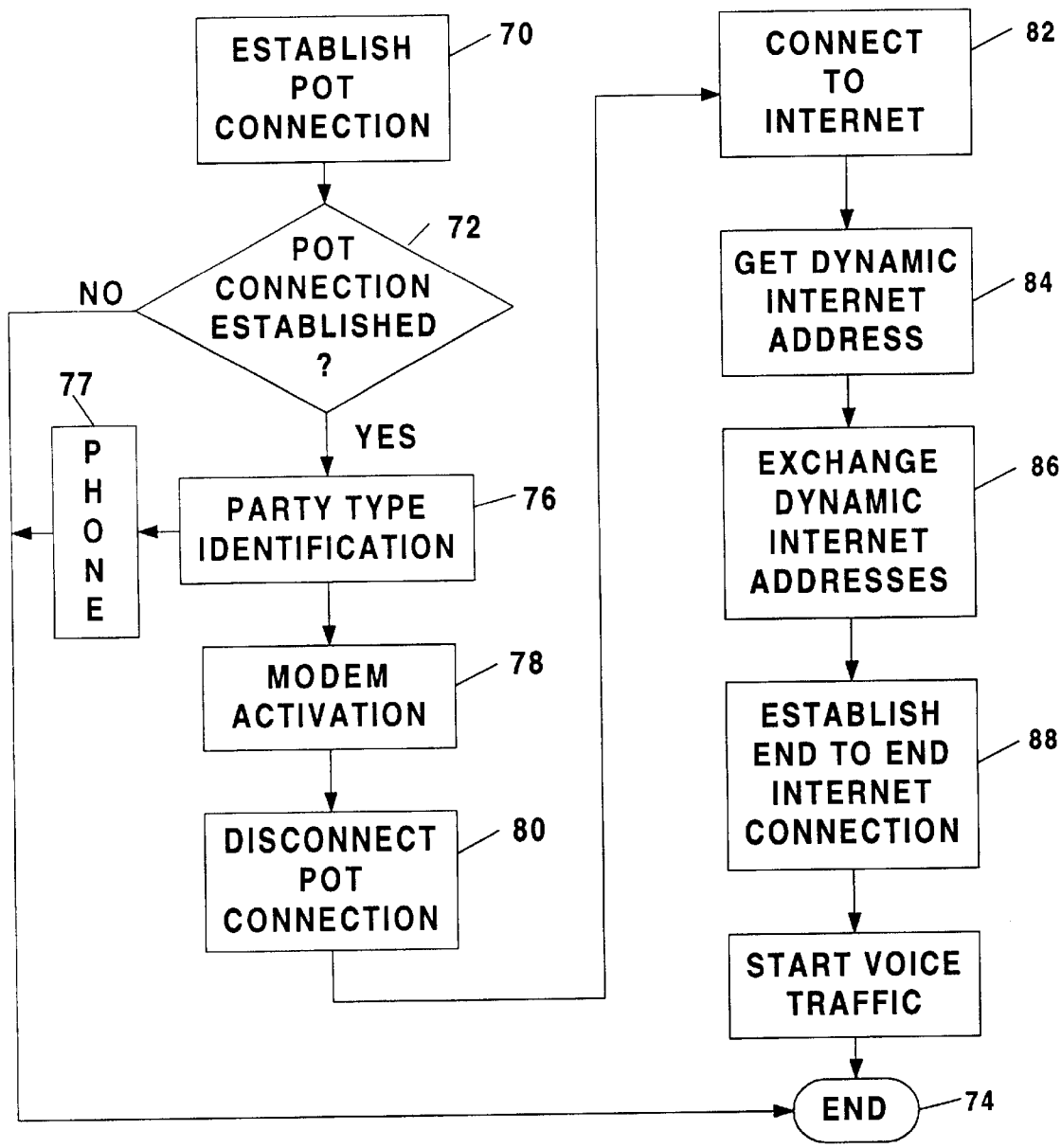
FIG. 4 is a flow diagram illustrating the detailed process of the present invention.

Referring to FIG. 4, a flow chart of the operation of the Internet party begins at step 70 wherein the phone system 52, for example, dials to reach another party by establishing a POT network connection. At step 72 the Internet party determines whether a POT network connection has been established. If no POT network connection has been established, the process ends at step 74. If a POT network connection has been established, at step 76 the process determines a party type identification. Party type identification may be one of two types, i.e., a traditional telephone or another Internet party. If the party is identified as a traditional phone, control is under regular known phone logic at step 77 and the process ends at step 74. If the party is identified as another Internet party, the process proceeds to step 78 wherein the modem is activated. Modem activation means that the Iphone system's microprocessor is programming the modem (or modem chip) so that it enters a communication state, and is able to transmit data on the line.

During the step 78, an Internet item, which may be an Internet address, is exchanged, and then at step 80 the POT network connection is terminated by the microprocessor of the Iphone system. Once the POT network connection is terminated, no further use is made of the POT network and the phone system.

At step 82, the process allows the Iphone system to establish a connection to the Internet. At step 84 the calling Iphone system gets the Internet address of the called party. At step 86, the calling party sends its Internet address to the called party. At this point, the calling party has identified the Internet address of the called party, and the called party has identified the Internet address of the calling party. Once both systems have identified their respective Internet addresses, at step 88 a normal TCP/IP end to end connection is established between the two Iphone systems by any one of the two stations establishing the TCP/IP connection using the other station's address. At step 90 user traffic, which in the case of an Internet phone is voice traffic, is initiated between the two Iphone systems and finally terminated at step 74, where the process successfully exits.

The steps outlined in FIG. 4 will now be more fully shown and described with reference to subsequent figures illustrated below.

Figure 5:
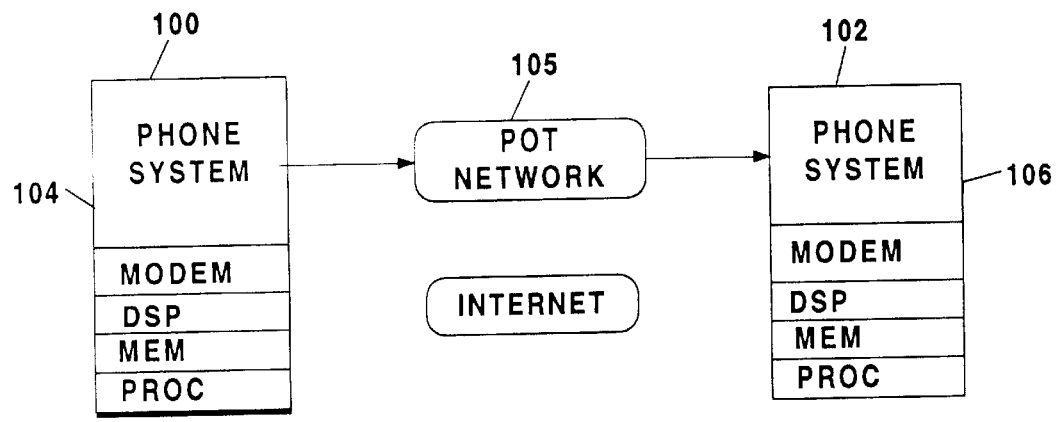
FIG. 5 is a block diagram illustrating an exemplary Internet end station connection over the POT network.

Referring to FIG. 5, a block diagram of two Internet parties, labeled 100 and 102 respectively, illustrates how a calling party uses a traditional phone function to call a second party. A phone system 104 of Internet party 100 dials and connects through a POT network 105 to reach Internet party 102. As a phone system 106 answers, a next phase of the process is entered.

Figure 6:
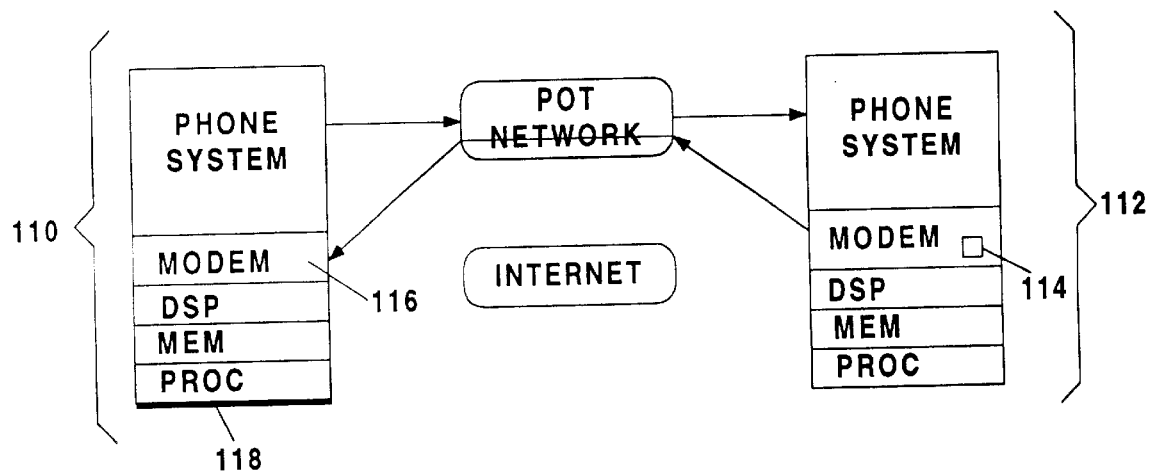
FIG. 6 is a block diagram of party type identification.

Referring to FIG. 6, a block diagram illustrates how party type identification occurs between Internet party 110 and Internet party 112. Two methods may be employed. In a first process a tone generator 114 in the called Internet party 112 beeps for some period of seconds. The calling Internet party 110 detects the tone produced by tone generator 114 and decides whether it is 'talking' to an Internet party 112. If the Internet party 110 decides that it is talking to a traditional phone that does not have a tone generator 114, no tone is detected and the Internet party 110 determines that it has called a traditional phone.

A second, slower process, starts the modem 116 when the connection is established at the called party side and checks a Carrier Detect modem signal (not shown) at the caller, i.e., Internet party 110. If Carrier Detect appears, the calling party decides the called party is the Internet party 112. If no Carrier Detect appears, the calling party decides the called party is a traditional phone.

Once the called party is identified as Internet party 112, an Internet party phase is initiated by the microprocessor 118 of the Internet party 110.

Figure 7:
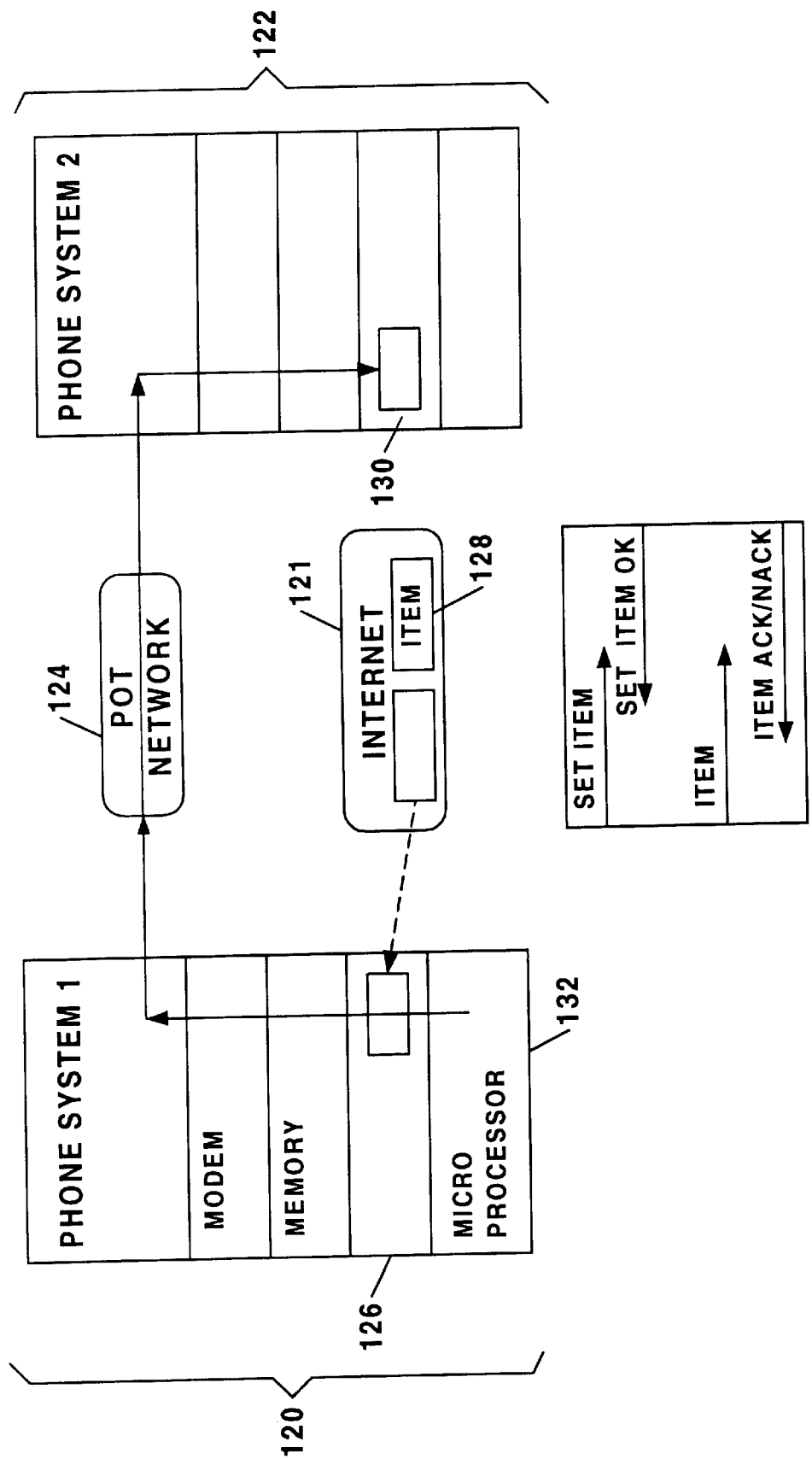
FIG. 7 is a block diagram of Internet item (information) exchange.

Referring now to FIG. 7, a block diagram showing Internet item exchange is illustrated. The Internet item may be a domain name system address or E-mail server address. The exchange illustrated in FIG. 7 is an essential phase for the present invention, since it enables an Internet party 120 to establish a connection via an Internet network 121 to an Internet party 122 using dynamically assigned Internet Protocol (IP) Addresses. What has been referred to above as an Internet item should be a reliable resource, like a permanent IP address, that will not change and will exist for a long period of time. This Internet item must be known to both parties, i.e., Internet party 120 and Internet party 122, and, as mentioned above, may be a domain name system address or an E-mail server address. Once the POT network 124 connection is terminated, the information contained in the Internet item is the only thing that can relate the Internet party 120 and the Internet party 122 over the Internet network 121, and thus establish an Internet point to point connection.

While the connection via the POT network 124 is open between Internet party 120 and Internet party 122, a memory 126 stores an Internet item 128 from the Internet network 121. This Internet item 128 is sent via the connection through the POT network 124 to a memory 130 of the Internet party 122. Once stored in memory 130, Internet party 120 and Internet party 122 both share knowledge the Internet item 128 and a microprocessor 132 may terminate the connection through the POT network 124.

Figure 8:
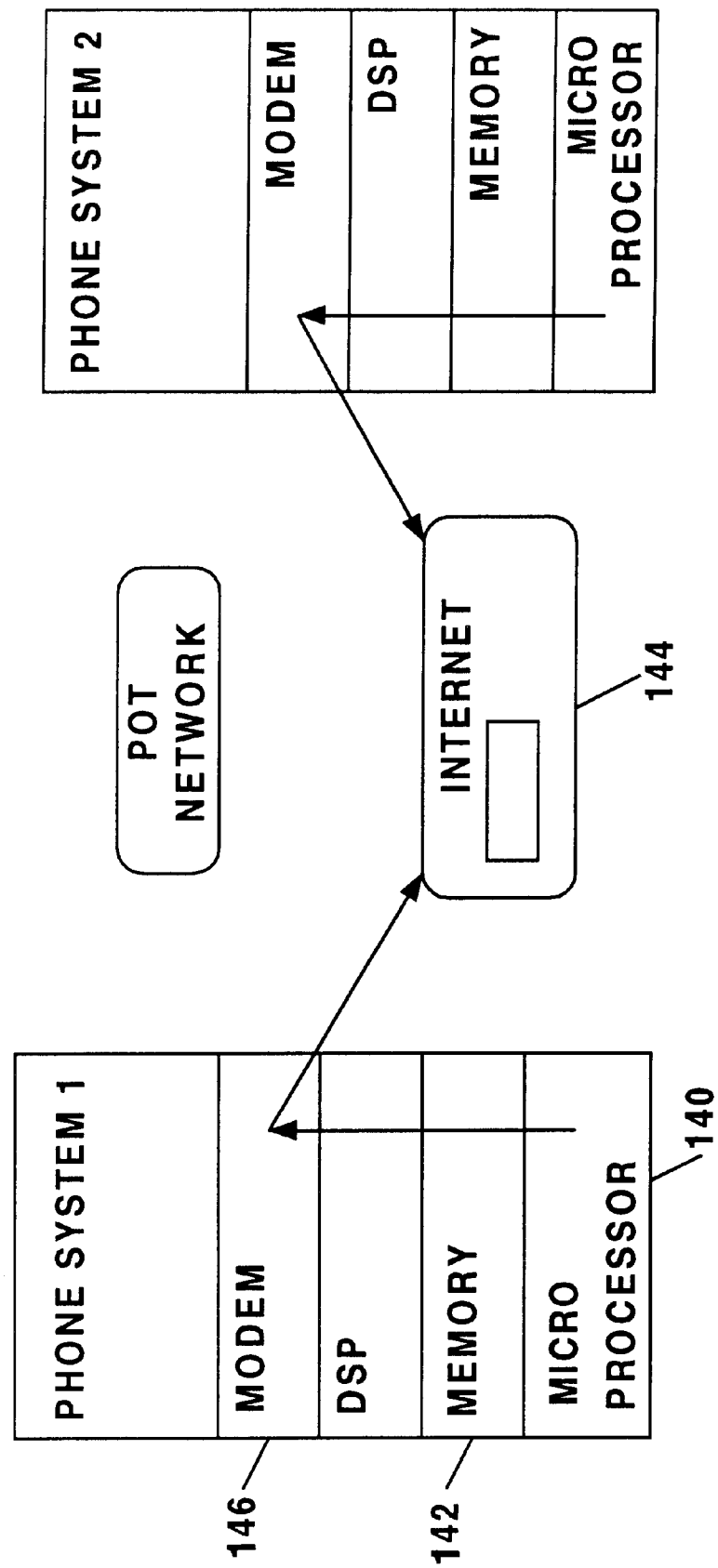
FIG. 8 is a block diagram of POT network disconnect.

Referring to FIG. 8, the microprocessor 140 uses a memory 142 stored Internet Provider access phone number (not shown) to connect to the Internet 144. It is preferred that the modem 146 is programmed by the microprocessor 140 to connect to the Internet service provider (not shown), and thus on to the Internet 144, at the highest possible baud rate.

Figure 9:
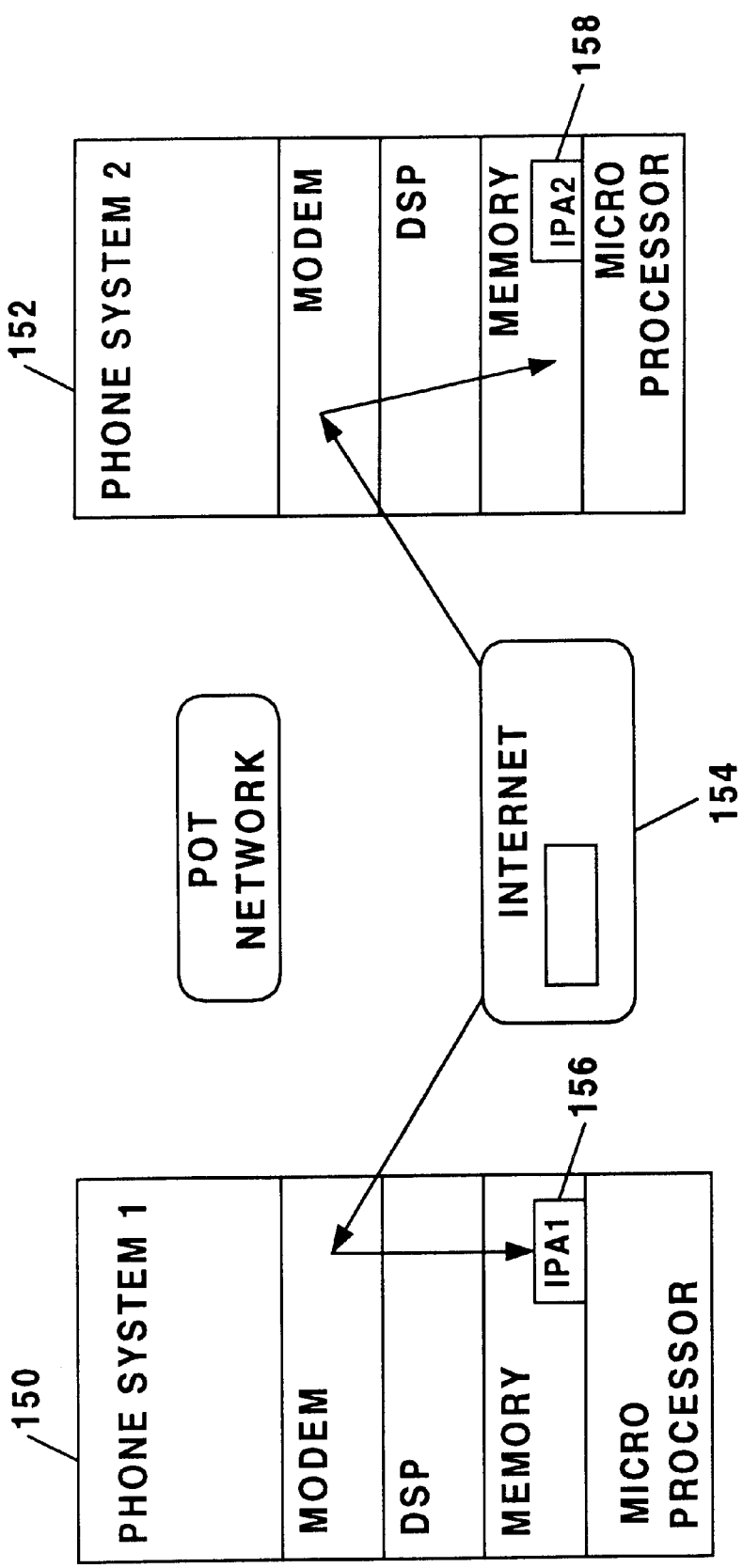
FIG. 9 is a block diagram of getting Internet addresses according to the principles of the present invention.

Referring to FIG. 9, once the Internet party 150 and the Internet party 152 establish a connection to the Internet 154, each of the Internet parties acquire their respective dynamically assigned IP addresses. More specifically, Internet party 150 acquires IP address IPA1 156 and Internet party 152 acquires IP address IPA2 158. The acquisition of IP addresses occurs by well known Internet procedures and need not be described here.

Figure 10:
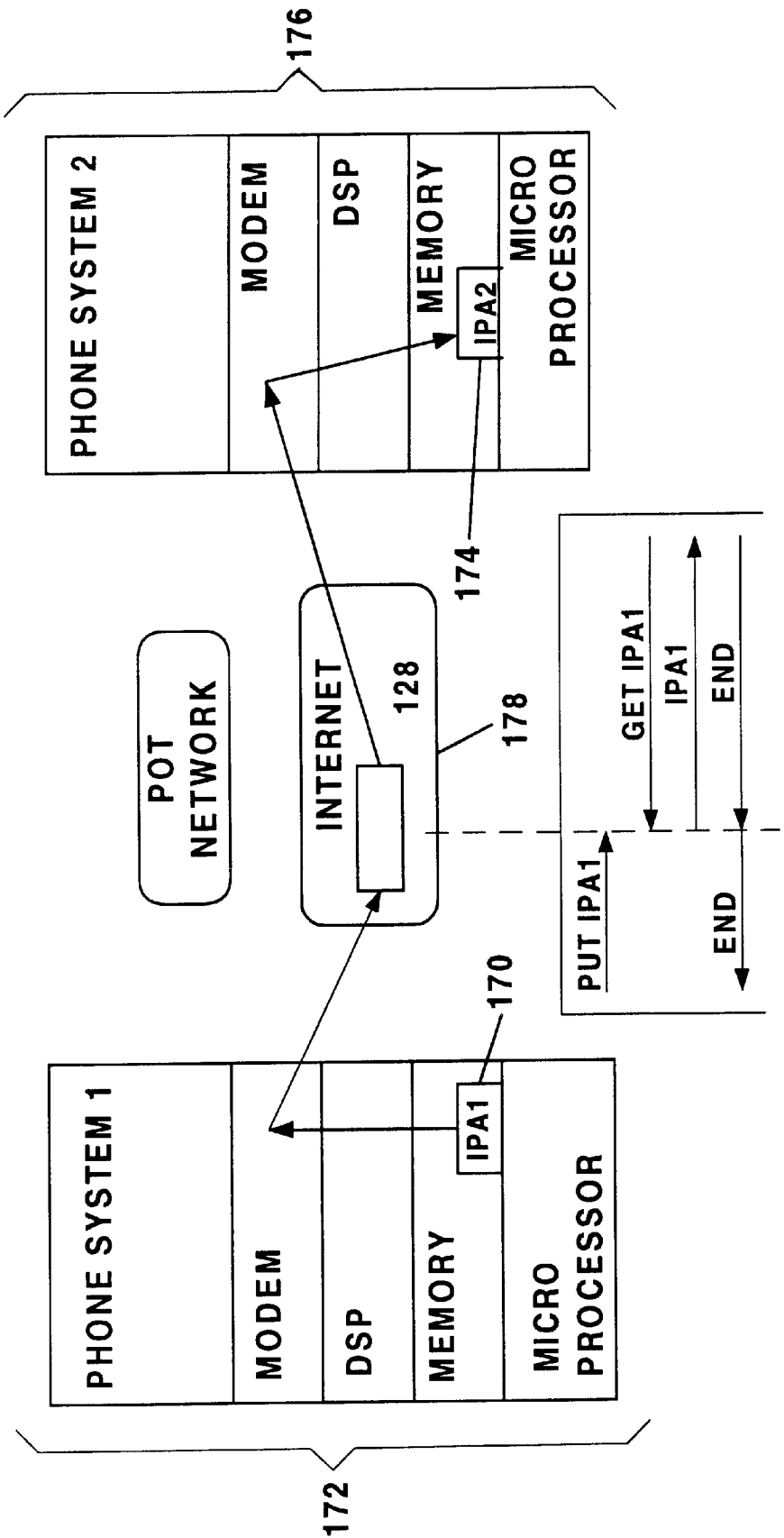
FIG. 10 is a block diagram of an exemplary dynamic Internet address exchange.

Referring to FIG. 10, using as the Internet item an E-mail server address, once the each Internet party acquires its unique IP address (as seen in FIG. 9), each Internet party must now exchange their IP address with the other party. For example, IPA1 170 is the dynamic IP address of Internet party 172. IPA2 174 is the dynamic IP address of Internet party 176. Using the Internet item 128 POT network 124 (of FIG. 7), the calling Internet party 172 sends out its IP address IPA1 170 via the Internet 178 and the called Internet party 176 polls until it sees IPA1 170. When Internet party 176 sees IPA1 170, Internet party 172 then sees the IP address IPA2 174 of Internet party 176. Thus, both Internet parties now know each other's IP address.

Figure 11:
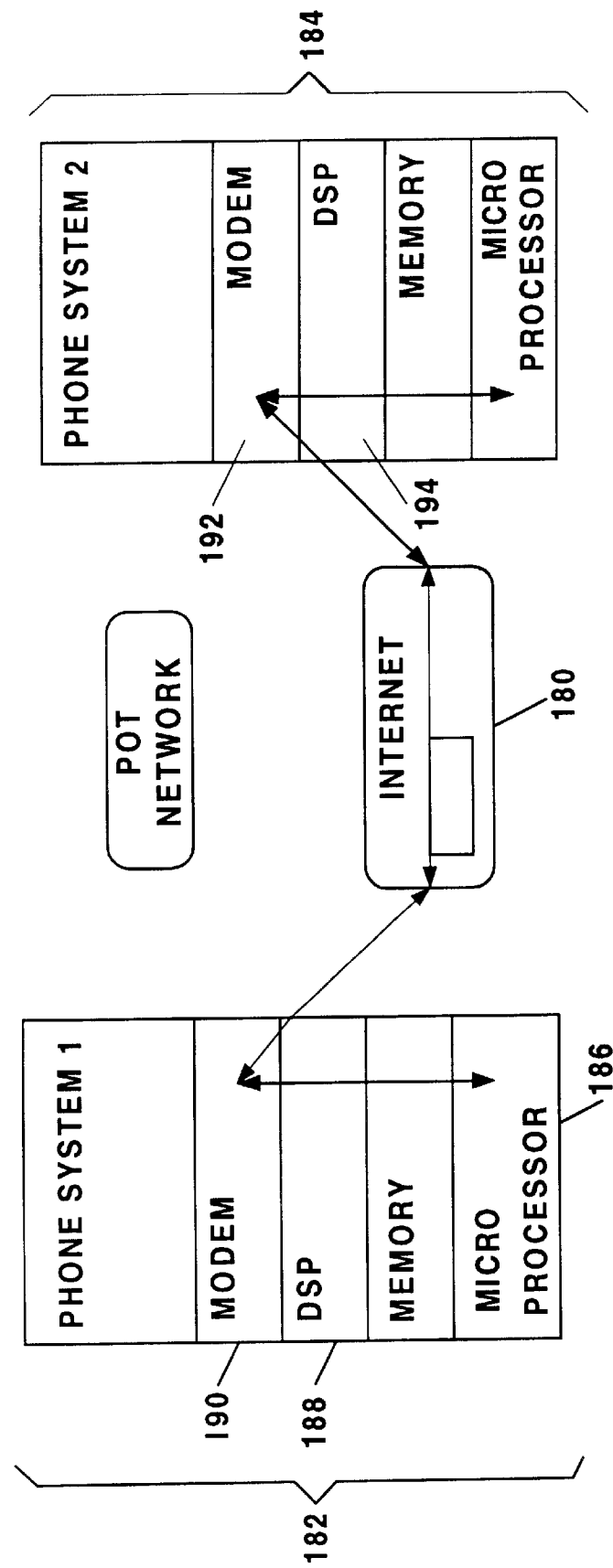
FIG. 11 is a block diagram of an exemplary end to end Internet connection establishment according to the principles of the present invention.

Referring to FIG. 11, a normal point to point TCP/IP connection is established over the Internet network 180 between Internet party 182 and Internet party 184. With this the Internet connection between the idle Internet end station is done for the Internet phone, which is a voice application. As the TCP/IP connection is established, a microprocessor 186 directs a DSP unit 188 to compress a voice signal received by Internet party 182, and feed the compressed voice signal to a modem 190 and out over the Internet 180. The Internet party 184 receives the compressed voice signal via a modem 192. The compressed voice signal is then decompressed in a DSP unit 194 and converted to analog and sent to a speaker subsystem (not shown) of Internet party 184.

Having described a preferred embodiment of the invention, it will now become apparent to those skilled in the art that other embodiments incorporating its concepts may be provided. It is felt therefore, that this invention should not be limited to the disclosed invention, but should be limited only by the spirit and scope of the appended claims.

What is claimed is:

1. A method of signaling comprising:
    establishing a Plain Old Telephone (POT) network connection between a first Internet end station and a second Internet end station, the Internet end stations not known to each other and to an Internet network;
    exchanging identification signals between the first Internet end station and the second Internet end station to check that both end stations support the method of signaling;
    pursuing the method of signaling if both stations support the method of signaling;
    exchanging an Internet item directly between the first Internet end station and the second Internet end station using the POT network connection;
    disconnecting the POT network connection;
    establishing an Internet connection between the first Internet end station and the Internet network;
    establishing an Internet connection between the second Internet end station and the Internet network;
    retrieving in both end stations their own dynamic IP addresses upon establishing their Internet connections;
    not registering end stations own IP and PSTN addresses with any entity in the network that is dedicated to supporting end to end connection establishment between end stations over the Internet;
    communicating the first dynamic Internet address of the first Internet end station directly to the second Internet end station using the Internet item that was exchanged over the initial POT connection;
    establishing an end to end Internet connection between the first end station and the second end station over the Internet network using the dynamic IP address communicated directly between the end stations;
    exchanging IP traffic between the first Internet end station and the second Internet end station; and
    terminating the end to end Internet connection.

2. The method of signaling according to claim 1 wherein the Internet item is an E-mail address.

3. The method of signaling according to claim 1 wherein the end to end Internet connection between the first dynamic Internet address and the second dynamic Internet address is normal point to point TCP/IP connection.

4. The method of claim 1 wherein establishing the POT network connection comprises:
    dialing a phone subsystem in the first Internet end station;
    detecting a tone in the second Internet end station; and
    connecting the second Internet end station to the first Internet end station via the POT network connection in response to detecting.

5. The method of signaling according to claim 1 wherein the end to end Internet connection between the first dynamic Internet address and the second dynamic Internet address is normal point to point UDP connection.

6. The method of claim 1 wherein establishing the Internet network connection is achieved solely by processes in the two end stations using standard PSTN and Internet services with no support from any dedicated piece of equipment that process the IP and PSTN addresses in any way.

7. The method of claim 1 wherein establishing the end-to-end Internet network connection is achieved without the registration and/or the mapping of the PSTN addresses to IP addresses.

8. The method of claim 1 wherein establishing the end to end Internet network connection is preceded by a direct PSTN connection between the Internet end stations, PSTN connection that facilitates a direct exchange of the Internet Item directly between the two end stations, and the use of the Internet Item to eliminate the process of mapping PSTN addresses to Internet (IP) addresses (or vice versa) in establishing the end to end Internet connection.

9. The method of claim 1 wherein establishing the end to end Internet network connection the roles of the first Internet end station and the second Internet end stations are reversed.

* * * * *